(12) United States Patent
Robertson

(10) Patent No.: US 8,532,622 B2
(45) Date of Patent: Sep. 10, 2013

(54) AUTOMATED INTEGRATION OF CONTENT FROM MULTIPLE INFORMATION STORES USING A MOBILE COMMUNICATION DEVICE

(75) Inventor: Ian Robertson, Waterloo (CA)

(73) Assignee: Blackberry Limited, Waterloo (CA)

( * ) Notice: Subject to any disclaimer, the term of this patent is extended or adjusted under 35 U.S.C. 154(b) by 961 days.

(21) Appl. No.: 11/045,260

(22) Filed: Jan. 31, 2005

(65) Prior Publication Data

US 2006/0174017 A1   Aug. 3, 2006

(30) Foreign Application Priority Data

Jan. 28, 2005   (EP) ..................................... 05100567

(51) Int. Cl.
*H04M 1/725*   (2006.01)
*G06F 15/16*   (2006.01)

(52) U.S. Cl.
USPC ....................... 455/412.1; 709/248

(58) Field of Classification Search
USPC ........................ 455/412.1; 707/201; 709/248
See application file for complete search history.

(56) References Cited

U.S. PATENT DOCUMENTS

| 5,832,489 | A | * | 11/1998 | Kucala ............................. 707/10 |
| 6,272,545 | B1 | * | 8/2001 | Flanagin et al. ............... 709/228 |
| 6,308,201 | B1 | * | 10/2001 | Pivowar et al. ................ 709/214 |
| 7,050,790 | B2 | * | 5/2006 | Yamaga ...................... 455/412.1 |
| 7,395,446 | B2 | * | 7/2008 | Luke et al. ..................... 713/375 |
| 7,739,246 | B2 | * | 6/2010 | Mooney et al. ............... 707/687 |
| 2004/0224672 | A1 | | 11/2004 | Linkert et al. |
| 2005/0027716 | A1 | * | 2/2005 | Apfel ............................. 707/100 |
| 2005/0091272 | A1 | * | 4/2005 | Smith et al. ................ 707/104.1 |

FOREIGN PATENT DOCUMENTS

WO   03079639 A   9/2003

* cited by examiner

*Primary Examiner* — Wesley Kim
(74) *Attorney, Agent, or Firm* — Jenna L. Wilson; Dimock Stratton LLP

(57) ABSTRACT

A system and method for merging information from a plurality of enterprise information stores on a network using a mobile communication device capable of accessing the network. Using the mobile communication device, communication or contact information is requested from the enterprise information stores, and merged with the content of a personal information store resident in the mobile communication device to create a merged data set for uploading to an enterprise information store on the network. In creating the merged data set, the value of a principal identifier in the requested communication information is used to query the personal information store in order to locate data in the personal information store having a value matching the principal identifier.

8 Claims, 3 Drawing Sheets

AUTOMATED INTEGRATION OF CONTENT FROM MULTIPLE INFORMATION STORES USING A MOBILE COMMUNICATION DEVICE

FIELD OF THE INVENTION

This invention relates generally to directories and databases for storing information on a computer network, and specifically to merging personal contact data from disparate information stores on a network using a mobile communication device.

BACKGROUND OF THE INVENTION

Current network architectures often contain a heterogenous mixture of information stores, including databases and directories. These information stores may contain personal and professional contact information, product information, certificates and public key data for authenticating users, network user account information, and other information necessary for maintaining a business or another enterprise. These disparate information stores may be stored on different servers in the network; a single information store, such as one accessed using the Lightweight Directory Access Protocol (LDAP), may reside on more than one server.

In practice, as information is added to one or more of these information stores, it is added on an ad hoc basis. The party entering information chooses an appropriate or available information store, depending on accessibility or authorization to use an information store, and enters the available information into the information store. For example, a directory entry may be created on one server to record a person's e-mail address and telephone number and, at another time, certificate information for that person might be added to a database. Later, that person's mobile number might be added to the previous directory, or to yet another directory or database within the same network.

In effect, identification information relating to a single user (certificates, telephone number, mobile number, e-mail addresses, mailing address, and other contact and authentication information) is split over multiple databases, directories, or servers. An example of the difficulty associated with storing identification information in such a way occurs when a user with a mobile communication device seeks to send secure electronic mail to a recipient within the same organization. The sender will be required to retrieve the recipient's e-mail contact information from the organization's LDAP server, and to also retrieve, in a separate step, the recipient's certificate information from a separate certificate store. Where the communication device stores such information in a personal information store, the single information store will have, as a result of the two separate information retrieval steps, two separate directory entries for the recipient: one for the e-mail contact information, and one for the certificate. The separate storage of the individual information on the network is replicated on the communication device.

As is indicated above, while a collection of individual information may be available on a single network, it is typically not all available to a user in a coherent format. A solution to this is to merge the information. However, the differing infrastructures of the different information stores mean that a simple merge is not possible. To merge such disparate individual information on a network typically requires a server-based system that will carry out a separate process in which all information stores are queried for information that relates to selected user identities. Such a system will then request user input to determine how to merge the located information. This approach to merging the individual information on the network includes a potentially high network overhead as well as disruptive and time-consuming user interaction while the merge is being carried out.

Accordingly, it is desirable to provide a system and method for merging the content of two or more individual information stores on a network. It is furthermore desirable to provide an automated and efficient manner of providing individual information to a mobile communication device for storage in a personal information store.

SUMMARY OF THE INVENTION

A system is provided for merging information from a plurality of enterprise information stores on a network for storing communication information, the system comprising a mobile communication device for accessing the network. The mobile communication device comprises a personal information store used in carrying out the communication function of the mobile communication device and program code operative to request communication information from the plurality of enterprise information stores as part of the communication function of the mobile communication device and, upon receipt of the requested information, to merge the received communication information with related information present in the personal information store in the mobile communication device to create a merged data set and to upload the merged data set to the one of the plurality of enterprise information stores.

A further aspect of the system provides that the information in at least one of the plurality of enterprise information stores on the network is stored in association with a principal identifier and that the information in the personal information store is stored in association with the principal identifier, and that the program code is further operative on receipt of enterprise information having an associated principal identifier value from the plurality of information stores to query the personal information store for information having a principal identifier value matching the principal identifier value for the received information.

A method for merging contact information is further provided, comprising the steps of providing a plurality of enterprise information stores on a network, providing a mobile communication device configured to provide communication functions and capable of accessing the enterprise information stores on the network, providing on the mobile communication device a personal contact information store for use in association with the communication functions of the device, requesting, using the mobile communication device, contact information from the plurality of enterprise information stores as part of the communication functions of the mobile communication device, receiving, using the mobile communication device, the requested contact information, merging, using the mobile communication device, the received contact information with related information present in the personal contact information store in the mobile communication device to create a merged data set; and uploading, using the mobile communication device, the merged data set to the one of the plurality of enterprise information stores. In a further embodiment, the method further provides the steps of identifying at least one principal identifier having a first value, the principal identifier being associated with the received contact information and with the personal contact information store, and querying the personal contact information store for a principal identifier having a value matching the first value.

A method is further provided for merging contact information from disparate enterprise information stores on a network using a mobile communication device, the mobile communication device being configured to provide a communication function and comprising a personal contact information store for use in association with the communication function, the method comprising the steps of requesting, using the mobile communication device, contact information from at least one of the disparate enterprise information stores, receiving, using the mobile communication device, the requested contact information, merging, using the mobile communication device, the received contact information with related information present in the personal contact information store in the mobile communication device to create a merged data set; and uploading, using the mobile communication device, the merged data set to at least one of the disparate enterprise information stores. In a further aspect, the method also provides the steps of identifying at least one principal identifier with a first value, the principal identifier being associated with the received contact information and with the personal contact information store, and prior to the step of merging, querying the personal contact information store for a principal identifier having a value matching the first value.

BRIEF DESCRIPTION OF THE DRAWINGS

In drawings which illustrate by way of example only a preferred embodiment of the invention.

DETAILED DESCRIPTION OF THE PREFERRED EMBODIMENT

Figure 1:
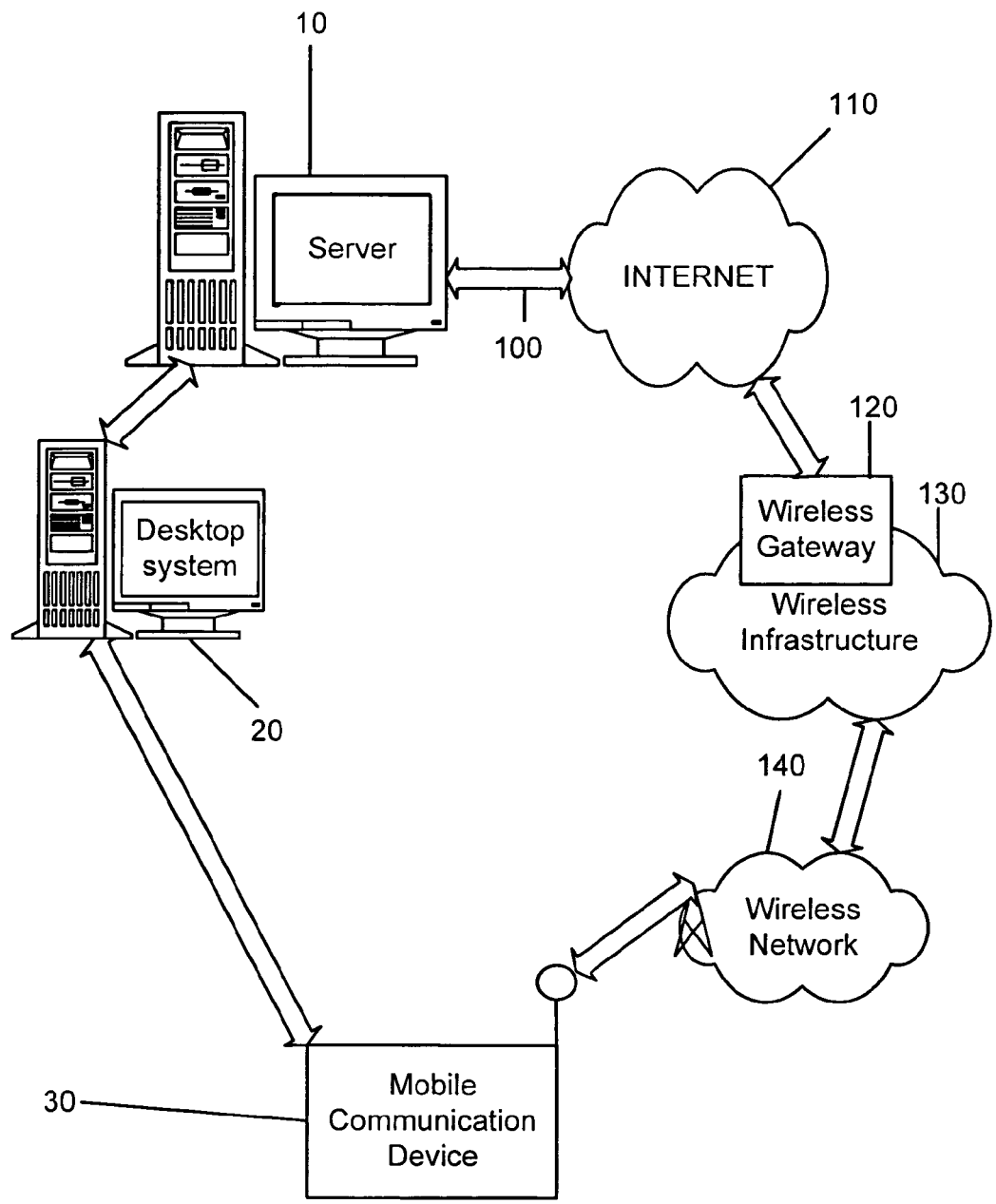
FIG. 1 is a block diagram of a network topology employing the system and method for merging content from two information stores.

Referring to FIG. 1, a simplified exemplary network topology supporting an embodiment of the invention is shown. A corporate network a server 10 is provided, which in the example of the preferred embodiment provides the functionality of a host server, a message server, and a directory server such as a LDAP server. The functions of the server may be provided by a plurality of servers, rather than the single server 10 illustrated in this embodiment. In communication with the server 10 are at least one desktop system 20 (a user terminal or other network access point may also be in communication with the server 10). The server 10 also has a connection 100 to the Internet 110. A wireless gateway and infrastructure 120, 130 between the Internet 110 and a wireless network 140 provides access to the corporate network by one or more mobile data communication devices 30, such as a personal digital assistant or other wireless handheld communication device. Alternatively, a mobile data communication device 30 may communicate with the corporate network in another manner, for example, over the wireless network 140 with a wireless virtual private network router (not shown), thus bypassing the wireless gateway 120.

The user desktop system 20 may be provided with a wireless communication port, universal serial bus (USB) cradle or other fixed-link connection for use in transmitting information between the desktop system 20 and the mobile communication device 30 when it is in the proximity of the desktop system.

Preferably, the corporate network server 10 also comprises a certificate management system, a contact information database accessible using the LDAP server, and a network user account directory. As a person skilled in the art will appreciate, the topology of the network depicted in FIG. 1 is only a simple example; additional servers, information stores and other services may be incorporated as required, and any appropriate protocols may be used to access and transmit data. For example, the certificate management system may reside on an external, publicly accessible server, accessible by the mobile communication device 30 via the Internet. In the present embodiment, however, there are at least two disparate information stores: the certificate management system and the contact information database. Preferably, the contact information database is served from an LDAP server, such as the Microsoft® Active Directory/Exchange server, or using any other appropriate protocol. The certificate management system is preferably managed using a product such as the Entrust® public key infrastructure (PKI). In the preferred embodiment, the contact information database provided on the LDAP server comprises a global address list (GAL), the contents of which are accessible to all users of the corporate network.

The mobile communication device 30 is preferably a two-way communication device having voice and data communication capabilities, provided with a transceiver, a microprocessor, memory comprising non-volatile memory and random access memory, and other device subsystems (not shown) including a display, one or more auxiliary input/output devices, a serial port, a keyboard, a speaker, a microphone, and a short-range wireless communications subsystem. Thus, for example, the mobile device 30 may communicate over a voice network, such as an analog or digital cellular network, and may also communicate over a data network. These voice and data networks may be separate communication networks using separate infrastructure, such as base stations, network controllers, etc., or they may be integrated into a single wireless network.

High-level communication applications, such as data communication applications, may be stored in memory for execution by the microprocessor of the mobile communication device 30. The data communication application may be used, for example, to send and receive data such as e-mail messages, files, organizer information, and short text messages between the mobile device and a plurality of other data devices. The mobile communication device 30 is further provided with an address book application, the functionality of which is described in greater detail below.

The mobile communication device 30 may be synchronized with the corporate network server 10 by placing the device 30 in a cradle (not shown), which couples the serial port of the device 30 to the serial port of the desktop computer system 20. Interfaces for other wired download paths may be provided in the mobile communication device 30, in addition to or instead of the serial port. For example, a USB port would provide an interface to a similarly equipped personal computer 20.

Figure 2:
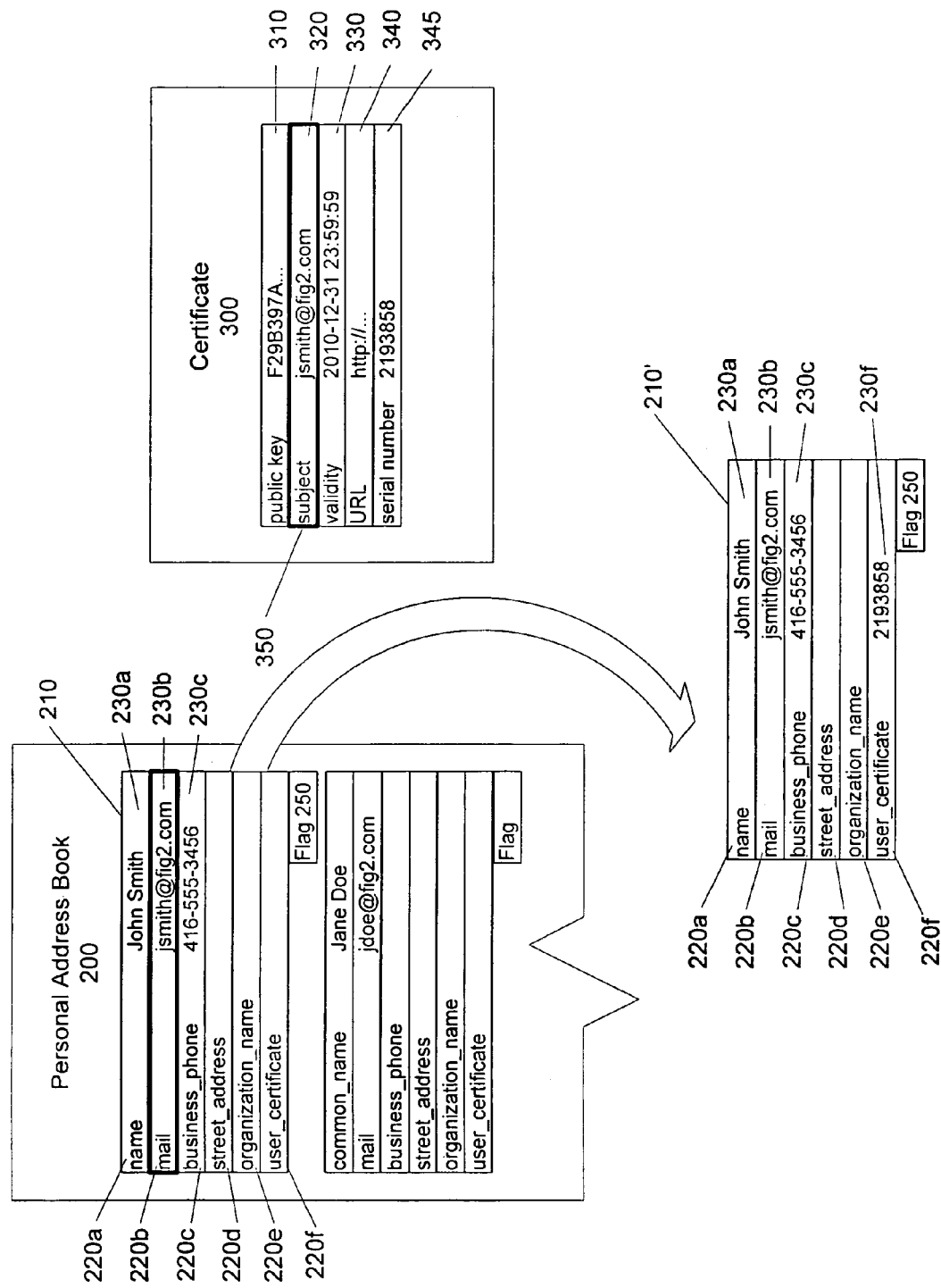
FIG. 2 is a block diagram of a personal address book information store and a public key certificate retrieved from a second information store.

An address book application, for use with data or voice communications, in particular e-mail messaging, is preferably stored in the non-volatile memory of the mobile communication device 30. Referring to FIG. 2, the device 30 is also provided with a contact database, which is a personal information store and is referred to as a personal address book 200. In the embodiment described, personal address book 200 may be stored in either volatile or non-volatile memory. The personal address book 200 is intended to be populated with a number of records containing contact information for potential recipients of communications from the user of the mobile communication device 30. Each record of the personal address book 200 comprises a set of attributes and values. In FIG. 2, for example, the first record 210 of the fragment of personal address book 200 shown comprises attributes name 220*a*, mail 220*b*, business_phone 220*c*, street_address 220*d*, organization_name 220*e*, and user_certificate 220*f*. Each of those attributes may be provided with a corresponding value, such as the name value 230*a* and mail address value 230*b*. Not all attributes may be provided with a corresponding value.

The data used to populate the personal address book 200 may have been entered by the user directly into the mobile communication device 30. Alternatively, it may have been downloaded from the global address list provided on the LDAP server on the corporate network upon request by the user when the communication device 30 is connected to the serial port of the desktop computer 20. The personal address book 200 may also be populated using other methods known in the art, including, but not limited to entering the data manually, by synchronizing with the desktop computer 20 over a local USB connection or a local wireless connection (using a protocol such as Bluetooth, for example), or wireless synchronization with the corporate network server 10. Thus, it will be appreciated that at least a portion of the data populating the personal address book 200 may be a subset of the data contained in the global address list.

The information in the personal information store (personal address book 200) on the communications device 30 is obtained in the course of the device being used to carry out communications. Applications executable on the device 30 permit requests to be made for information available on networks accessible by the device. In response to such requests, communication information is received that is stored in the personal information store (personal address book 200) on communications device 30. As is described below, such a request may be made for a security certificate stored in an information store on an accessible network.

The description of the preferred embodiment refers to enterprise information stores. It will be understood that such information stores include those that may be maintained at server 10 or desktop system 20 and may also include information stores that are remotely accessible as part of the operation of the enterprise (for example a certificate authority). The communication information accessed by mobile communication device 30 is broadly defined to include information that is usable in mobile communication device 30 carrying out its functions, The preferred embodiment of the system and method for integrating communication information from different enterprise information stores will now be described in relation to FIGS. 2 through 4. When the user of the mobile communication device 30 wishes to transmit a secure message via e-mail to a recipient, the device user retrieves via the wireless network 140 a public key certificate 300 from the certificate management system on the corporate server 10. As depicted in FIG. 2, the public key certificate 300 includes public key 310, subject 320 (such as the name of the individual holding the certificate, an e-mail address, a computer, or an organization), a validity period 330 (during which period of time the certificate is deemed to be valid, unless it is revoked), a location for a revocation centre 340 (used to determine if the certificate 300 had been revoked), and a serial number 345.

Where information is provided to mobile communication device 30 in response to a request made in the process of carrying out a communication operation, it is possible for the address book application executing on the device to store a separate, new record for the recipient, consisting only of the public key certificate and an associated e-mail address, in the address book 200 (personal information store) of the communication device 30.

However, in the preferred embodiment, the address book application avoids replicating the separate storage of individual information. The address book application seeks to add the received certificate information to an existing record stored in the address book of device 30. This is carried out by the address book application querying the personal address book 200 using techniques known in the art for information that relates to the received certificate information. Preferably, a corresponding record in the address book 200 is located using a principal identifier 350 obtained from the certificate 300. The principal identifier 350 is preferably an attribute with a value that is known to be suitable for unique identification of a user or recipient within the scope of the personal address book 200. As will be understood by a person skilled in the art, the query of the personal address book 200 may be accomplished by comparing the principal identifier of the received certificate information to the fields contained in the records of the personal address book 200. Such a query may result in a plurality of potential candidates for matches in the personal address book 200, which may be further refined by heuristics provided within the address book application or by allowing the user to select the appropriate matching personal address book entry 200.

In the example of FIG. 2, the principal identifier 350 is a subfield in the "subject" identifier, as shown (specified as the user e-mail address 320 associated with the certificate). E-mail addresses are generally considered suitable as principal identifiers in the art because they are typically unique to each individual or organization, and are usually readily available from the personal address book 200. Persons skilled in the art will recognized that other attributes may also be suitable for use as a principal identifier; for example, in the Microsoft Outlook® product, each database entry has a unique common name, and therefore the name attribute 220*a* may be used to uniquely identify a user or recipient in the personal address book 200. The personal address book application may be configured with a heuristic function that allows the personal address book 200 to be queried for variances of the principal identifier, for example variances in case or the use of a nickname or a common variant of a proper name (e.g., "Bob" instead of "Robert").

If the query by the address book application successfully locates an entry in the personal address book 200 having a mail attribute value equal to the value of the principal identifier 350, then certain information from the certificate is copied to the corresponding record in the personal address book 200, resulting in merged record 210'. If the query does not locate such an entry, then a new entry is created in the personal address book 200 containing the certificate information. Thus, creation of multiple entries for the same recipient on the mobile communication device 30 is avoided.

Figures 3, 4:
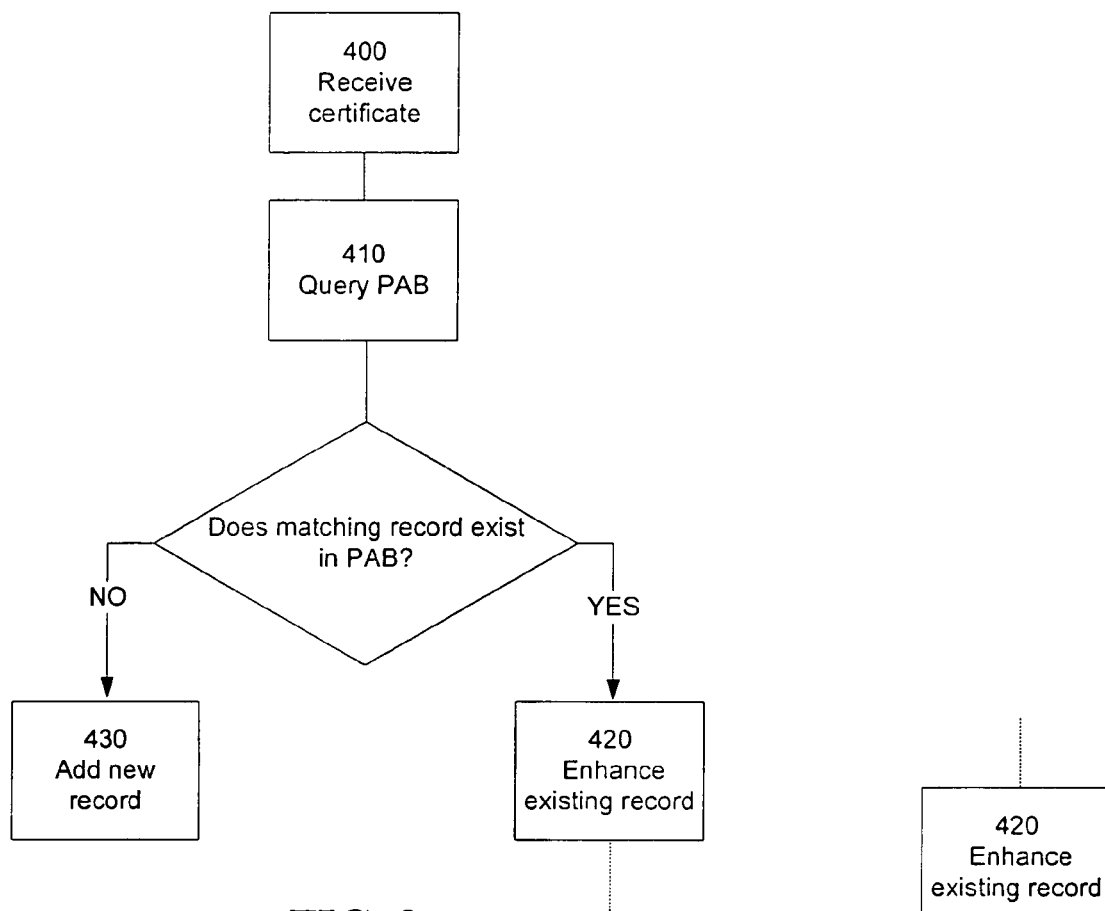
FIG. 3 is a flow diagram showing a method for merging information from two information stores.
FIG. 4 is a further embodiment of a method for merging information from two information stores.

The method for integrating the retrieved certificate 300 with the existing address book 200 on the communication device 30 is shown in the flow diagram of FIG. 3. At step 400, a certificate is received from a first information store, such as the certificate management system. At step 410, the personal address book 200 residing in memory in the mobile communication device 30 is queried using the key identifier. If the key identifier is located in the personal address book 200, then the certificate information is added at step 420 as a value for the user_certificate attribute in the existing personal address book record 210, forming merged record 210'. If the principal identifier is not found, then a new record is added to the personal address book 200 comprising only the information retrieved with the certificate 300 at step 430. The data from the server 10 and the personal address book 200 is thus merged, creating a rich information store without a duplicate address book entry on the mobile communication device 30.

The above describes how the data from the two different information stores was reconciled in the mobile communication device 30 to provide coherent data and to avoid the duplication of separate information storage in the personal information store of device 30. However, carrying out such steps in storing information on the device 30 does not ensure that the information stores resident on the server 10 are similarly merged. The global address list on the server 10, for example, may comprise an entry for a user or recipient that does not include certificate information, although certificate information for that individual is available via the certificate management system on the server 10, or from an external certificate store accessible to the mobile communication device 30 via the Internet. Therefore, in a preferred embodiment, once the data in the personal address book 200 on the mobile device 30 has been merged with the downloaded certificate 300, a flag 250 associated with the merged address book record 210' is set to indicate the record's newly merged status. When the mobile device 30 is being synchronized with the server 10 via the fixed-link connection between the desktop system 20 and the mobile communication device 30, the synchronizing utility running on the mobile device 30 may upload the merged record 210' from mobile device 30 to a personal address book resident on the desktop system 20. Preferably, in turn a synchronization utility running on the network or on the desktop system 20 similarly merges the newly-synchronized personal address book resident on the desktop system 20 with the global address list on the server 10. In a further embodiment, if the mobile device 30 is not connected to the desktop system 20, the synchronization utility may be configured to operate over the wireless network 140 between the device 30 and the network server 10, bypassing the desktop system 20.

As described above, individual information is obtained by communication device 30 from information stores on the server as part of its communication process. This information is then added to the personal information store in communication device 30 in a coherent manner. The synchronization step is then utilized to effectively merge individual information on the server 10 by uploading the combined information from the communication device 30 to the information stores on the accessible network.

As shown in FIG. 4, once the merged record 210' has been created, at step 440 the flag 250 is set to indicate that the record 210' contains new information, and at step 450 the updated values of the record 210' are uploaded to the server 10 and merged with the global address list in a similar manner to that used on the mobile device 30. For example, the synchronizing utility will query the global address list for a matching principal identifier 350. Once the record 210' has been merged with the global address list, the corresponding flag 250 is reset at step 460.

Thus, the system accomplishes not only a merger of data from disparate information stores on the mobile communication device 30, but also allows for incremental synchronization of the disparate information stores on the server 10 itself, using the merged records 210' created on the mobile communication device 30. When a plurality of mobile communication devices 30, each individually practising the method of creating merged records 210', each communicate with the server 10 to merge their respective merged records 210' with the global address list resident on the network 10, the process of merging and updating the global address list is thus distributed among a number of devices similar to that shown by example as device 30. It is not necessary for the server 10 to perform a server-based merging process, with the attendant use of server resources, to consolidate disparate information store entries. In a preferred embodiment, only those flagged, merged records 210' are utilized in this synchronization process, although in an alternate embodiment the entire personal address book 200 may be uploaded and used to synchronize the information stores on the server 10. Preferably, if the personal address book 200 comprises entries flagged as "private", as is known in the art, those entries may be excluded from this synchronization process so that private address book entries are not shared on the global address list.

Further, the updating of server data may be carried out without waiting until the mobile device 30 is being synched with the server 10. The data communication between the mobile device 30 and the server 10 may take place at any time over the wireless network 140 and the Internet 110, preferably when the cost of air time for wireless data communication is inexpensive, particularly if the personal address book 200 is large.

It will be appreciated that in order to achieve this synchronization and updating of information stores, the user of the mobile device 30 will have adequate permissions on the server 10 to update the global address list. As the communication between the mobile device 30 and the server 10 is preferably undertaken only with transport encryption, the synchronization procedure is secure.

Preferably, the address book application on the mobile device 30, when importing certificates 300 from a source other than the server 10, also verifies the serial number 345 against any certificates listed in the global address book or the certificate management system on the server 10 during synchronization. Since it is possible for a single user or recipient to have multiple certificates 300, the system and method described above allow additional certificates 300 to be recorded in the global address list on the server 10.

Various embodiments of the present invention having been thus described in detail by way of example, it will be apparent to those skilled in the art that variations and modifications may be made without departing from the invention. The invention includes all such variations and modifications as fall within the scope of the appended claims.

I Claim:

1. A mobile communication device adapted to communicate over a wireless network, the mobile communication device comprising:
    a transceiver for communicating over the wireless network;
    memory for storing a a personal information store; and,
    a microprocessor in communication with the transceiver and the memory, the microprocessor being configured to cause the mobile communication device to:
        receive, in response to a request transmitted from the mobile communication device, information of a first type from a first server;
        identify a principal identifier value associated with the information of the first type;
        query a personal information store at the mobile communication device for a first record comprising information of a second type that is different from the first type and an associated personal principal identifier value matching the principal identifier value;

merge the information of the first type with the first record to create a merged data set stored in the memory;
identify a merged data set principal identifier value associated with the merged data set,
query a different server for a second record having a principal identifier value matching the merged data set principal identifier value; and
merge the merged data set with the second record.

2. The mobile communication device of claim 1, further adapted to transmit a secure e-mail message secured using a public key, wherein the mobile communication device is further operative to:
request a public key certificate containing the public key from the first server, the first server comprising a certificate management system; and
create the merged data set by merging the received public key certificate received in response to said request with the first record.

3. A method for merging information using a mobile communication device, comprising:
receiving over a network at the mobile communication device, in response to a request transmitted from the mobile communication device, information of a first type from a first server;
identifying a principal identifier value associated with the information of the first type;
querying a personal information store at the mobile communication device for a first record comprising information of a second type that is different from the first type and an associated personal principal identifier value matching the principal identifier value;
merging the information of the first type with the first record to create a merged data set for storage at the mobile communciation device;
identifying a merged data set principal identifier value associated with the merged data set;
querying a different server for a second record having a principal identifier value matching the merged data set principal identifier value; and
merging the merged data set with the second record.

4. The method of claim 3, wherein the first server comprises a certificate management system and the information of the first type thus received comprises a public key certificate, and the different server comprises a global address list.

5. A computer program product comprising a non-transitory storage medium comprising program code, the program code being executable on a mobile communication device to implement the method of:
receiving over a network at the mobile communication device, in response to a request transmitted from the mobile communication device, information of a first type from a first server;
identifying a principal identifier value associated with the information of the first type;
querying a personal information store at the mobile communication device for a first record comprising information of a second type that is different from the first type and an associated personal principal identifier value matching the principal identifier value;
merging the information of the first type with the first record to create a merged data set for storage at the mobile communication device;
identifying a merged data set principal identifier value associated with the merged data set;
querying a different server for a second record having a principal identifier value matching the merged data set principal identifer value; and
merging the merged data set with the second record.

6. A system for merging information, the system comprising:
a plurality of information stores available over a network, each of said plurality of information stores being comprised in one of a plurality of servers;
at least one mobile communciation device adapted to communicate with the network over a wireless link;
wherein the at least one mobile communication device is configured to:
access a first record of a first type stored at a first one of the plurality of information stores comprised in a first one of the plurality of servers,
identify a principal identifier value associated with the record of the first type,
query a personal information store at the mobile communication device for a second record of a second type that is different from the first type, the second record comprising an associated personal principal identifier value matching the principal identifier value;
merge information obtained from the record of the first type with the second record to create a merged record,
store the merged record at the mobile communication device,
identify a merged record principal identifier value associated with the merged record
query a second one of the plurality of information stores comprised in a different server of the plurality of servers for a further record having a principal identifier value matching the merged record principal identifier value; and
merge the merged record with the further record.

7. The system of claim 6, comprising a plurality of said mobile communication devices, such that a plurality of further records stored in the second one of the plurality of information stores are merged with a plurality of merged records.

8. The system of claim 7, wherein at least some of the plurality of mobile communication devices are configured to merge the merged record with records in disparate information stores on the network.

* * * * *